United States Patent
Willis

(10) Patent No.: US 9,816,820 B2
(45) Date of Patent: Nov. 14, 2017

(54) POSITIONING SYSTEM HAVING SMOOTHED KALMAN FILTER UPDATE

(71) Applicant: CATERPILLAR INC., Peoria, IL (US)

(72) Inventor: Frank Arthur Willis, Canton, IL (US)

(73) Assignee: Caterpillar Inc., Peoria, IL (US)

( * ) Notice: Subject to any disclaimer, the term of this patent is extended or adjusted under 35 U.S.C. 154(b) by 146 days.

(21) Appl. No.: 14/990,760

(22) Filed: Jan. 7, 2016

(65) Prior Publication Data

US 2017/0199040 A1   Jul. 13, 2017

(51) Int. Cl.
| | |
|---|---|
| G01C 21/16 | (2006.01) |
| G01C 21/26 | (2006.01) |
| G01S 19/39 | (2010.01) |
| G01M 17/00 | (2006.01) |
| G01C 21/00 | (2006.01) |
| G06F 7/00 | (2006.01) |
| G01C 21/10 | (2006.01) |
| G08C 21/00 | (2006.01) |
| G01C 25/00 | (2006.01) |
| G06F 11/30 | (2006.01) |

(52) U.S. Cl.
CPC ............ G01C 21/165 (2013.01); G01C 21/26 (2013.01); *G01C 21/00* (2013.01); *G01C 21/10* (2013.01); *G01C 21/16* (2013.01); *G01C 25/00* (2013.01); *G01C 25/005* (2013.01); *G01M 17/00* (2013.01); *G01S 19/39* (2013.01); *G06F 7/00* (2013.01); *G06F 11/30* (2013.01); *G08C 21/00* (2013.01)

(58) Field of Classification Search
CPC ...... G01C 21/00; G01C 21/16; G01C 25/005; G01C 21/10; G01C 21/165; G01C 21/26; G08C 21/00; G06F 7/00; G06F 11/30; G01M 17/00; G01S 19/39
See application file for complete search history.

(56) References Cited

U.S. PATENT DOCUMENTS

| | | |
|---|---|---|
| 6,175,806 B1 | 1/2001 | Thuente |
| 7,894,512 B2 | 2/2011 | Beadle et al. |
| 8,996,302 B2 | 3/2015 | Marti et al. |
| 8,996,311 B1 | 3/2015 | Morin et al. |

(Continued)

OTHER PUBLICATIONS

Salah Sukkarieh et al., "A High Integrity IMU/GPS Navigation Loop for Autonomous Land Vehicle Applications," IEEE Transactions on Robotics and Automation, vol. 15, No. 3, Jun. 1999.

*Primary Examiner* — Behrang Badii
(74) *Attorney, Agent, or Firm* — Finnegan, Henderson, Farabow, Garrett & Dunner LLP

(57) ABSTRACT

A method and a system of determining a position of a mobile machine are disclosed. According to certain embodiments, the system may include a first sensor configured to generate a first signal indicative of a parameter of the mobile machine. The system may also include a second sensor configured to generate a second signal indicative of a pose of the mobile machine. The system may further include a controller in communication with the first and second sensors. The controller may be configured to generate one or more estimated poses of the mobile machine based on the first signal. The controller may further be configured to update each estimated pose with a fraction of a correction. The correction may be determined, based on the second signal, in a measurement update stage of a Kalman filter.

20 Claims, 4 Drawing Sheets

(56) References Cited

U.S. PATENT DOCUMENTS

| | | | |
|---|---|---|---|
| 9,494,430 B2* | 11/2016 | Friend | |
| 2004/0073360 A1* | 4/2004 | Foxlin | G01C 25/005 |
| | | | 701/517 |
| 2012/0265472 A1 | 10/2012 | Osumi et al. | |
| 2012/0310468 A1* | 12/2012 | Wong | G01C 25/00 |
| | | | 701/29.9 |
| 2014/0281779 A1 | 9/2014 | Wellman et al. | |
| 2015/0153460 A1 | 6/2015 | Fleming | |
| 2016/0116289 A1* | 4/2016 | Friend | G01C 21/165 |
| | | | 701/469 |

* cited by examiner

POSITIONING SYSTEM HAVING SMOOTHED KALMAN FILTER UPDATE

TECHNICAL FIELD

The present disclosure relates generally to a positioning system and, more particularly, to a positioning system having a smoothed Kalman filter update.

BACKGROUND

Autonomously and semi-autonomously controlled machines are capable of operating with little or no human input by relying on information received from various machine systems. Control of the machines may be dependent on navigational data provided by various sensors mounted onboard the machines. In order for the machines to operate properly, the information provided by the sensors must be accurate and reliable.

For example, an inertial measurement unit (IMU) is often used to provide pose information of a machine. The pose information may include, for example, one or more of position, attitude, linear velocity, angular velocity, and acceleration. The IMU, however, is not ideal, and may have noise, bias, or drift due to, for example, aging and temperature. The noise, bias, and drift may accumulate, affecting the accuracy of the determined pose. Thus, an independent pose measurement, such as global positioning system (GPS) signals, may be used to update the readings of the IMU. Typically, a Kalman filter may be used to account for bias and scale errors in the IMU by utilizing the GPS data.

U.S. Pat. No. 8,996,311 of Morin, which issued on Mar. 31, 2015 (the '311 patent), discloses a navigation system using an IMU for navigating a vehicle and a GPS to correct accumulated errors from the IMU. To produce the navigation information, the system performs two main processes, the mechanization of the raw IMU data into a trajectory (i.e., a time series of position, velocity, and attitude) and the correction of that trajectory with updates estimated by an extended Kalman filter. The mechanization occurs at the rate of the IMU data, usually higher than 100 Hz. The Kalman filter runs at a lower rate, for example, at 1 Hz, such that errors in the trajectory accumulate to become clearly observable when compared to the GPS information. The lower rate tends to keep the updates sufficiently separated in time to eliminate (or at least mitigate) time correlated errors on the update measurements.

Although the system of the '311 patent may accurately navigate the vehicle, the error accumulation creates noticeable discontinuities in the trajectory of the IMU data. In many machine control applications, having a smooth trajectory is desired. For example, during the control of a steering wheel of a truck or a blade on a tractor, a sudden change of velocity or orientation not only may cause discomfort to the machine operator, but also may lead to dangerous maneuvers.

The disclosed system is directed to overcoming one or more of the problems set forth above and/or other problems of the prior art.

SUMMARY OF THE INVENTION

In one aspect, the present disclosure is directed to a positioning system for use with a mobile machine. The system may include a first sensor configured to generate a first signal indicative of a parameter of the mobile machine. The system may also include a second sensor configured to generate a second signal indicative of a pose of the mobile machine. The system may further include a controller in communication with the first and second sensors. The controller may be configured to generate one or more estimated poses of the mobile machine based on the first signal. The controller may further be configured to update each estimated pose with a fraction of a correction. The correction may be determined, based on the second signal, in a measurement update stage of a Kalman filter.

In another aspect, the present disclosure is directed to a method of determining a position of a mobile machine. The method may include generating, by a first sensor, a first signal indicative of a parameter of the mobile machine. The method may also include generating, by a second sensor, a second signal indicative of a pose of the mobile machine. The method may further include generating, by a controller, one or more estimated poses of the mobile machine based on the first signal. The method may further include updating, by the controller, each estimated pose with a fraction of a correction. The correction may be determined, based on the second signal, in a measurement update stage of a Kalman filter.

In yet another aspect, the present disclosure is directed to a non-transitory computer-readable storage medium storing instructions for enabling at least one processor to execute a method of determining a position of a mobile machine. The method may include receiving, from a first sensor, a first signal indicative of a parameter of the mobile machine. The method may also include receiving, from a second sensor, a second signal indicative of a pose of the mobile machine. The method may further include generating one or more estimated poses of the mobile machine based on the first signal. The method may further include updating each estimated pose with a fraction of a correction. The correction may be determined, based on the signal, in a measurement update stage of a Kalman filter.

DETAILED DESCRIPTION

Figure 1:
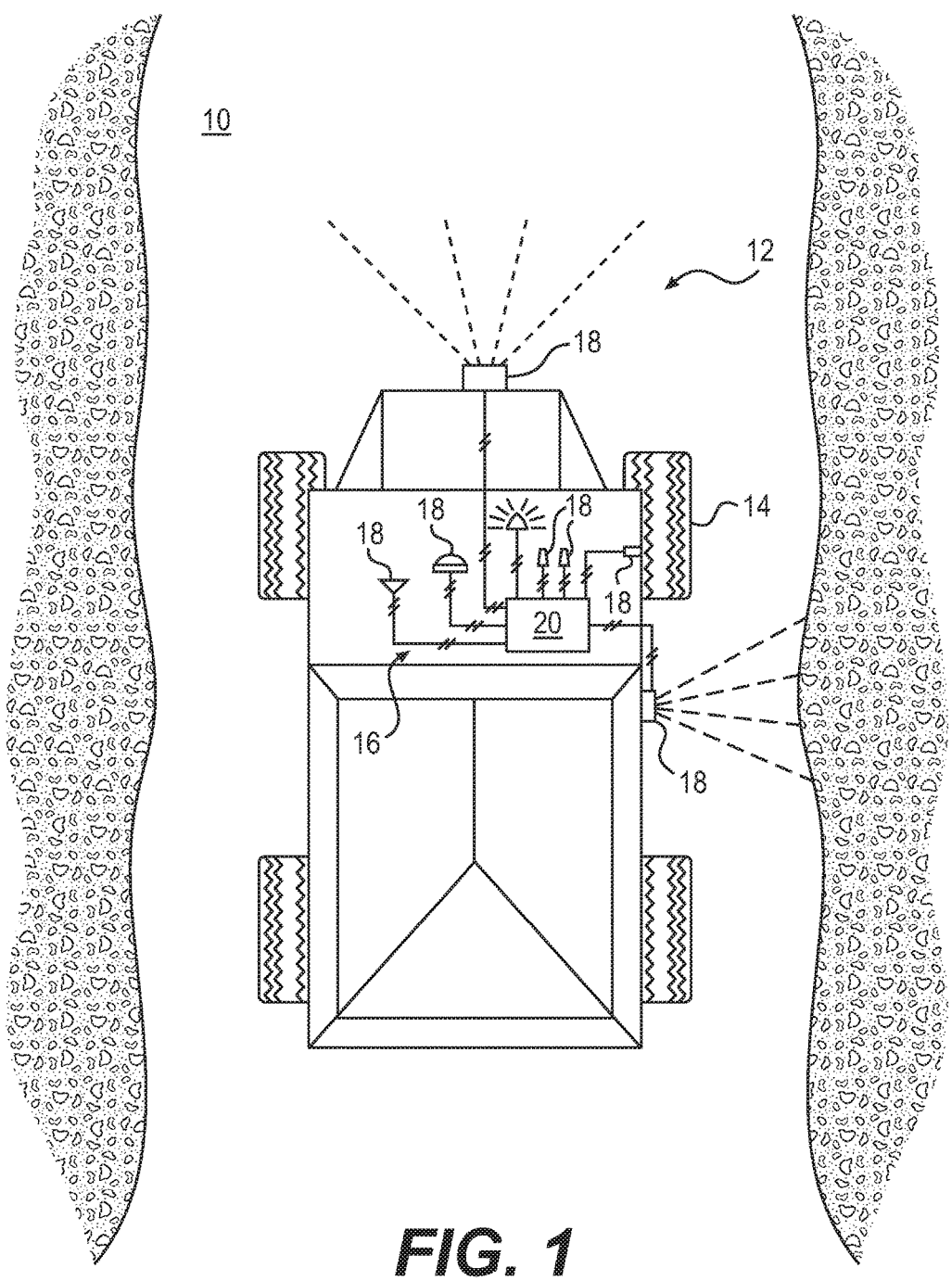
FIG. 1 is a diagrammatic illustration of a machine equipped with an exemplary positioning system.

FIG. 1 illustrates a worksite 10 and an exemplary machine 12 performing a task at worksite 10. Worksite 10 may include, for example, a mine site, a landfill, a quarry, a construction site, or any other type of worksite. The task being performed by machine 12 may be associated with altering the geography at worksite 10, and may include a hauling operation, a grading operation, a leveling operation, a plowing operation, a bulk material removal operation, or any other type of operation. As machine 12 operates at worksite 10, the shapes, dimensions, and general positions of the terrain may change.

Machine 12 may embody a mobile machine, for example a haul truck, a dozer, a motor grader, or a loader. Machine 12 may be a manned machine configured to traverse worksite 10 under the control of an operator, a self-directed machine configured to autonomously traverse worksite 10, or a hybrid machine configured to perform some functions autonomously and other functions under the control of a local or remote operator. Machine 12 may include an engine or other power source (not shown) functional to provide a power output for various operations of machine 12. The power produced by the engine may be directed to various electrical and mechanical systems of machine 12 such as, for example, a transmission (not shown) for transmitting the power to one or more traction devices 14 (for example, tracks), to a hydraulic system (not shown) for driving one or more hydraulic components in machine 12, to an implement system (not shown) for actuating one or more work tools, or to any other electrical or mechanical system configured to perform an operation associated with machine 12.

Machine 12 may be equipped with a positioning system 16 that facilitates or enhances navigation about worksite 10. Positioning system 16 may include, among other things, a plurality of positioning sensors 18 in communication with a controller 20. Positioning sensors 18 may include any number and/or combination of devices known in the art for generating signals indicative of a pose (i.e., position, orientation, acceleration, velocity, heading, angular rate, and/or other parameters) of machine 12. For example, positioning sensors 18 could include one or more of a global navigation satellite system (GNSS) receiver (for example, a GPS receiver), an IMU, a mechanical odometer, a visual odometer, a perception position sensor, a compass, a ground speed radio detection and ranging (RADAR) or light detection and ranging (LIDAR) receiver, a pseudolite receiver, etc.

Some positioning sensors 18 may be faster, more accurate, and/or more reliable than others in generating pose signals. For example, some positioning sensors 18 (for example, GPS receivers) may be capable of directly measuring a pose of machine 12 at a rate of about 1 Hz, while other positioning sensors 18 (for example, IMU, odometers, etc.) may generate signals used by controller 20 to estimate the pose of machine 12 at a much faster rate, for example, at about 100 Hz. Likewise, some positioning sensors 18, such as GPS receiver, may be more accurate than other sensors. However, a GPS receiver may be blocked from communicating with satellites at times, such as when machine 12 is operating in a canyon or during an overcast day. For these reasons, controller 20 may be configured to simultaneously rely on signals from all positioning sensors 18 during machine navigation.

Figure 2:
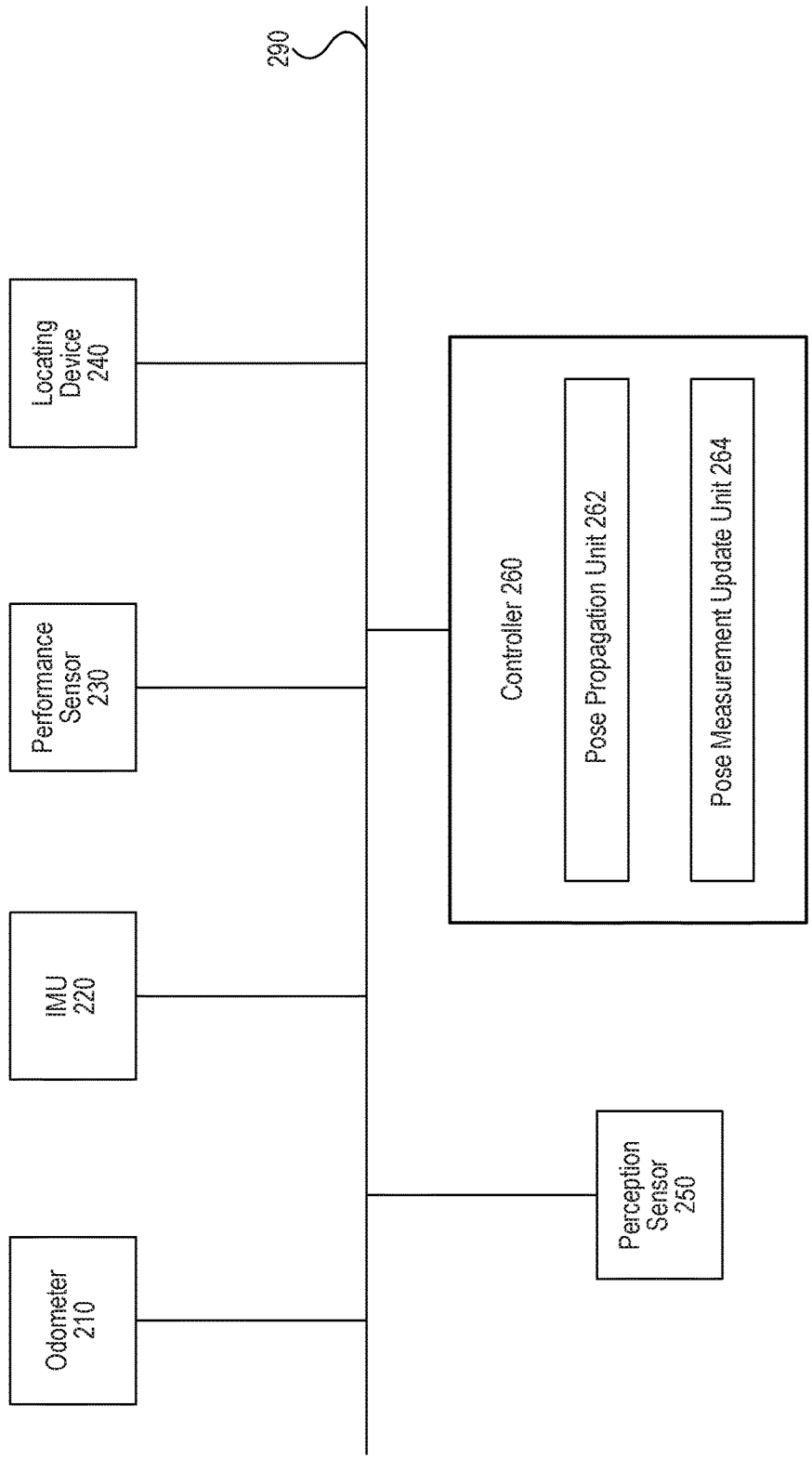
FIG. 2 is a block diagram of an exemplary positioning system that may be used in conjunction with the machine of FIG. 1.

FIG. 2 illustrates an exemplary embodiment of positioning system 16. For example, positioning system 16 may be used in machine 12. Referring to FIG. 2, positioning system 16 may include one or more of an odometer 210, an IMU 220, a performance sensor 230, a locating device 240, a perception sensor 250, and a controller 260. The above sensors and controller 260 may be connected to each other via a bus 290. While a bus architecture is shown in FIG. 2, any suitable architecture may be used, including any combination of wired and/or wireless networks. Additionally, such networks may be integrated into any local area network, wide area network, and/or the Internet.

Odometer 210 may provide a signal indicative of a distance traveled by machine 12. Odometer 210 may provide as the signal, a measurement of number of rotations of traction devices 14, such as a wheel. Odometer 210 may also provide, as the signal indicative of a distance traveled by machine 12, a measurement of number of rotations of a member of a drive train in machine 12. For example, odometer 210 may provide a measurement of the number of rotations of an axle of machine 12.

IMU 220 may include devices that provide angular rates and acceleration of the machine 12. For example, IMU 220 may include a 6-degree of freedom (6 DOF) IMU. A 6 DOF IMU consists of a 3-axis accelerometer, 3-axis angular rate gyros, and sometimes a 2-axis inclinometer. The 3-axis angular rate gyros may provide signals indicative of the pitch rate, yaw rate, and roll rate of the machine 12. The 3-axis accelerometer may provide signals indicative of the acceleration of machine 12 in the x, y, and z directions.

Performance sensor 230 may include any device capable of providing parametric values or machine parameters associated with performance of machine 12. For example, performance sensor 230 may include a payload sensor that provides a signal indicative of a payload of the machine 12. Performance sensor 230 may further include a slip detector that provides a signal indicative of a slip of machine 12. Performance sensor 230 may further include devices capable of providing signals indicative of a slope of the ground on which the machine 12 is operating, an outside temperature, tire pressure if traction device 14 is a wheel, etc. It will be understood that performance sensor 230 may have one or more of the above-mentioned devices that provide the different parametric values or machine parameters such as payload, temperature, tire pressure, slip, slope, etc.

Locating device 240 may include any device capable of providing a signal that indicates the machine's pose. For example, locating device 240 could embody a GNSS device, such as a GPS device, that receives or determines pose information associated with machine 12 and can provide an independent measurement of the pose of machine 12. Locating device 240 may be configured to convey a signal indicative of the received or determined pose information to one or more interface devices for display of machine pose, if desired. The signal may also be directed to controller 260 for further processing. In exemplary embodiments, locating device 240 may receive a GPS signal as the pose signal indicative of the pose of the machine 12 and provide the received pose signal to controller 260 for further processing. Additionally, locating device 240 may also provide an uncertainty measure associated with the pose signal. However, it will be understood by one of ordinary skill in the art that the disclosed exemplary embodiments could be modified to utilize other indicators of the pose of the machine 12, if desired.

Perception sensor 250 may include any device that is capable of providing scene data describing an environment in the vicinity of the machine 12, such as part of worksite 10. Exemplarily, perception sensor 250 may embody a device that detects and ranges objects located 360 degrees around machine 12. For example, perception sensor 250 may be embodied by a LIDAR device, a RADAR device, a sound navigation and ranging (SONAR) device, a camera device, or any other device known in the art. In one example, perception sensor 250 may include an emitter that emits a detection beam, and an associated receiver that receives a reflection of that detection beam. Based on characteristics of the reflected beam, a distance and a direction from an actual sensing location of perception sensor 250 on machine 12 to a portion of a sensed physical object may be determined. By utilizing beams in a plurality of directions, perception sensor 250 may generate a picture of the surroundings of the machine 12. For example, if perception sensor 250 is embodied by a LIDAR device or another device using multiple laser beams, perception sensor 250 may generate a cloud of points as the scene data describing an environment in the vicinity of machine 12.

Controller 260 may include one or more processors, a memory, and a storage, included together in a single device and/or provided separately. The processors(s) may include one or more known processing devices, such as a microprocessor from the Pentium™ or Xeon™ family manufactured by Intel™, the Turion™ family manufactured by AMD™, or any other type of processor. The memory may include one or more storage devices configured to store information used by controller 260 to perform certain functions related to the disclosed embodiments. The storage may include a volatile or non-volatile, magnetic, semiconductor, tape, optical, removable, nonremovable, or another type of storage device or computer-readable medium. The storage may store programs and/or other information, such as information related to processing data received from one or more sensors, as discussed in greater detail below.

In one embodiment, the memory may include one or more pose estimation programs or subprograms loaded from the storage or elsewhere that, when executed by the processor(s), perform various procedures, operations, or processes consistent with the disclosed embodiments. For example, the memory may include one or more programs that enable controller 260 to, among other things, collect data from odometer 210, IMU 220, performance sensor 230, locating device 240, perception sensor 250, and process the data according to disclosed embodiments such as those embodiments discussed with regard to FIG. 4, and estimate the pose of machine 12 based on the processed data.

In certain exemplary embodiments, the pose estimation programs may enable controller 260 (more particularly enable the processor of controller 260 ) to process the received signals using a Kalman filter to measure and to estimate the poses of machine 12. A Kalman filter is a mathematical method that may be used to determine accurate values of measurements observed over time, such as measurements taken in a time series. The Kalman filter's general operation involves two phases, a propagation or "predict" phase and a measurement or "update" phase. In the predict phase, the value estimate from the previous timestep in the time series is used to generate an a priori value estimate. In the update phase, the a priori estimate calculated in the predict phase is combined with an estimate of the accuracy of the a priori estimate (e.g., the variance or the uncertainty), and a current measurement value to produce a refined a posteriori estimate.

Still referring to FIG. 2, controller 260 may include a pose propagation unit 262 and a pose measurement update unit 264. Pose propagation unit 262 and pose measurement update unit 264 may implement the propagation (or "predict") phase and the measurement update (or "update") phase, respectively, of a Kalman filter. Although the components included in controller 260 are shown as separate components, they may be implemented in any combination of hardware and/or software. For example, in one embodiment, the components in controller 260 shown in FIG. 2 may be implemented in the form of software stored on one or more of the memory and/or the storage that, when executed by the processor(s), enable controller 260 to perform functions related to the disclosed embodiments.

Pose propagation unit 262 may receive signals from odometer 210, IMU 220, performance sensor 230, locating device 240, and perception sensor 250. By utilizing these signals, pose propagation unit 262 may propagate or estimate certain states of machine 12. For example, pose propagation unit 262 may predict the following states: position, linear velocities, angular velocities, and angular orientation (attitude) of the machine 12. Pose propagation unit 262 may receive, from odometer 210, a signal indicative of the distance traveled by machine 12. The distance signal may be a measurement of the number of rotations of a traction device 14 (for example, wheel). Pose propagation unit 262 may also receive a scale factor, which when multiplied by the number of rotations of traction device 14, provides the distance traveled by the machine 12 in a given time period. Pose propagation unit 262 may calculate, the distance traveled by the machine 12 by multiplying the received scale factor with the number of rotations of traction device 14. Further, pose propagation unit 262 may estimate a 3-dimensional (3D) velocity (i.e., a linear velocity including components in the x-, y-, and z-axis directions respectively) of the machine 12 by dividing the x-, y-, and z-components of the calculated distance by a time period corresponding to the calculated distance. In actual implementations, for example, the (North, East, Down) directions or (Forward, Right, Down) directions of machine 12 may be chosen as the (x, y, z) directions. In another exemplary embodiment, pose propagation unit 262 may calculate the 3D velocity of the machine 12 by integrating signals indicative of a 3D acceleration (i.e., a linear acceleration including components in the x-, y-, and z- directions respectively) from IMU 220. In another exemplary embodiment, pose propagation unit 262 may calculate the 3D velocity using signals from both odometer 210 and IMU 220 and combine the resulting velocities to generate a predicted 3D velocity. Further, the predicted 3D velocity and/or the distance traveled by machine 12 may be adjusted based on the machine parameters from performance sensor 230. For example, the distance traveled may be adjusted to account for slipping of machine 12.

Pose propagation unit 262 may also receive signals indicative of the angular rates (roll rate, yaw rate, and pitch rate) of the machine 12 from IMU 220. By integrating the angular rates, pose propagation unit 262 may determine the attitude or angular orientation (roll, heading, and pitch) of the machine 12. By utilizing the angular rates and the 3D velocity, pose propagation unit 262 may estimate a pose of machine 12. Pose propagation unit 262 may also calculate an uncertainty for the pose estimate which may be set equal to the uncertainty from an error covariance matrix of the Kalman filter.

Pose measurement update unit 264 may implement the measurement update (or "update") phase of the Kalman filter. In the measurement update phase, an updated pose estimate is determined for machine 12 by utilizing the propagated pose estimate output by pose propagation unit 262 and an independent pose measurement. Pose measurement update unit 264 may determine an independent position measurement using at least one of the pose signal generated by locating device 240 and the scene data generated by perception sensor 250. Initially, pose measurement update unit 264 may determine whether a pose signal is generated by locating device 240. For example, if locating device 240 is a GPS receiver, pose measurement update unit 264 may determine whether GPS signals are received by locating device 240. If the GPS signal is not received, pose measurement update unit 264 may utilize the scene data as the independent pose measurement.

In one exemplary embodiment, pose measurement update unit 264 may utilize as the independent pose measurement, either the pose indicated by the GPS signal or the pose indicated by the scene data, depending on the uncertainty associated with the GPS signal and the scene data. For example, if the uncertainty associated with the GPS signal is 1 meter whereas the uncertainty associated with the scene data is 1 cm, pose measurement update unit 264 may utilize the pose indicated by the scene data as the independent pose measurement. Similarly, if the scene data uncertainty is higher than the GPS signal uncertainty, the pose indicated by the GPS signal may be utilized as the independent pose measurement. In another exemplary embodiment, the scene data and the GPS signal may be combined based on their respective uncertainties to generate the independent pose measurement. For example, the two pose indications may be added by weighting them based on their respective uncertainties.

Having determined the independent pose measurement, pose measurement update unit 264 may determine a correction to the propagated pose estimate output by pose propagation unit 262 based on the propagated pose estimate output and the independent position measurement. Exemplarily, generic Kalman filter measurement update equations may be utilized to determine the correction. Pose measurement update unit 264 may determine an error between the measured pose and the pose estimate. The error may be determined as a subtraction function, although other strategies may alternatively be implemented. Pose measurement update unit 264 may then perform a Kalman Filter update based on the error to determine a corresponding correction to the pose estimate. Pose measurement update unit 264 may further update the pose estimate using the correction.

In the disclosed embodiment, the estimated poses are generated more often than the measured poses. For example, odometer 210 and/or IMU 220 may generate signals at a frequency of 100 Hz, while locating device 240 may receive GPS signals and/or perception sensor 250 may generate the scene data at a frequency of 1 Hz. Accordingly, pose propagation unit 262 may propagate the pose estimate at the frequency of 100 Hz, while pose measurement update unit 264 may generate the measured poses at the frequency of 1 Hz. Conventionally, pose measurement update unit 264 may apply the correction to the pose estimate only when the correction is determined, i.e., at a frequency of 1 Hz, and then feed back the updated pose estimate to pose propagation unit 262. Pose propagation unit 262 may then propagate the pose estimate in the next cycle of calculations. However, because of the correction, the updated pose estimate may form a discontinuity from other propagated pose estimates that are not updated with the correction. This discontinuity is undesirable when smooth propagation is preferred, such as, for example, if the propagated pose estimate is a velocity or a heading of machine 12. A discontinuity in the propagation means a sudden change of velocity or heading, which may cause discomfort to the machine operator, damage to machine 12, and/or even safety hazards.

Therefore, to eliminate the discontinuity, instead of applying the correction all at once, pose measurement update unit 264 may divide the correction into a series of fractions and apply one fraction to each propagated pose estimate. In one exemplary embodiment, the fraction of the correction may be determined based on the propagation frequency (for example, the frequency of odometer and/or IMU signals) and the measurement update frequency (for example, the frequency of GPS signals). For example, the fraction of the correction may be determined as:

$$\delta(\text{Pose}) = \frac{f_2}{f_1} \text{Correction} \qquad \text{Eq. 1}$$

Here, $f_1$ is the propagation frequency, $f_2$ is the measurement update frequency, and $\delta(\text{Pose})$ is the fraction of the correction to be applied to each propagated pose estimate. In this manner, the correction may be spread over each propagated pose estimate and thus a smoothed Kalman filter update without discontinuity may be achieved.

Figure 3:
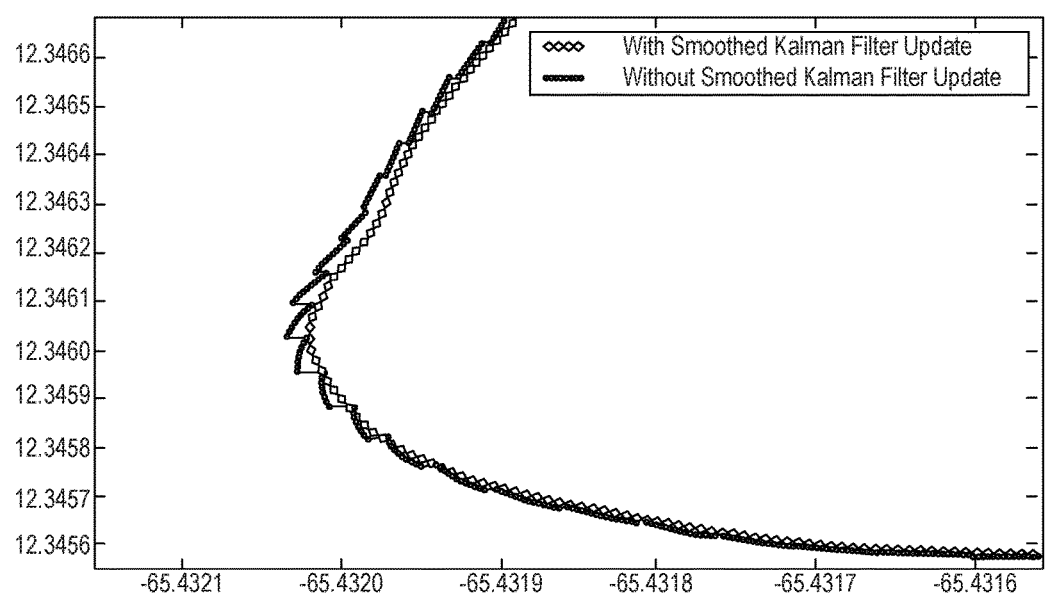
FIG. 3 is a schematic diagram illustrating propagations of a pose estimate that may be implemented by the positioning system of FIG. 2.

FIG. 3 is a schematic diagram illustrating the propagation of a pose estimate, according to an exemplary embodiment. Referring to FIG. 3, the horizontal axis corresponds to the latitude of machine 12, and the vertical axis corresponds to the longitude of machine 12. Thus, the propagation of the pose estimates forms a trajectory that shows the heading of machines 12. The dark circles are pose estimates without smoothed Kalman filter update. Correspondingly, the trajectory formed by the dark circles may have multiple discontinuities, with each discontinuity being formed when a correction is applied to the pose estimate. In contrast, the diamonds are pose estimates with smoothed Kalman filter update. Correspondingly, the trajectory formed by the diamonds is smooth, without noticeable discontinuities.

In exemplary embodiments, besides updating each pose estimate with a fraction of the correction, pose measurement update unit 264 may also determine the scale factor for odometer 210 and the biases for IMU 220. For example, pose measurement update unit 264 may compare the pose estimate output from pose propagation unit 262 and the measured pose output from pose measurement update unit 264 to adjust the scale factor to bring the "predict" phase pose closer to the "update" phase pose. The adjusted scale factor may be utilized by pose propagation unit 262 in the next iteration of the "predict" phase. Similarly, pose measurement update unit 264 may also calculate the biases for IMU 220. Because the scale factor and bias do not cause discontinuities on the propagation of the pose estimates, no smoothed Kalman filter treatment needs to be applied to the scale factor and bias.

INDUSTRIAL APPLICABILITY

Figure 4:
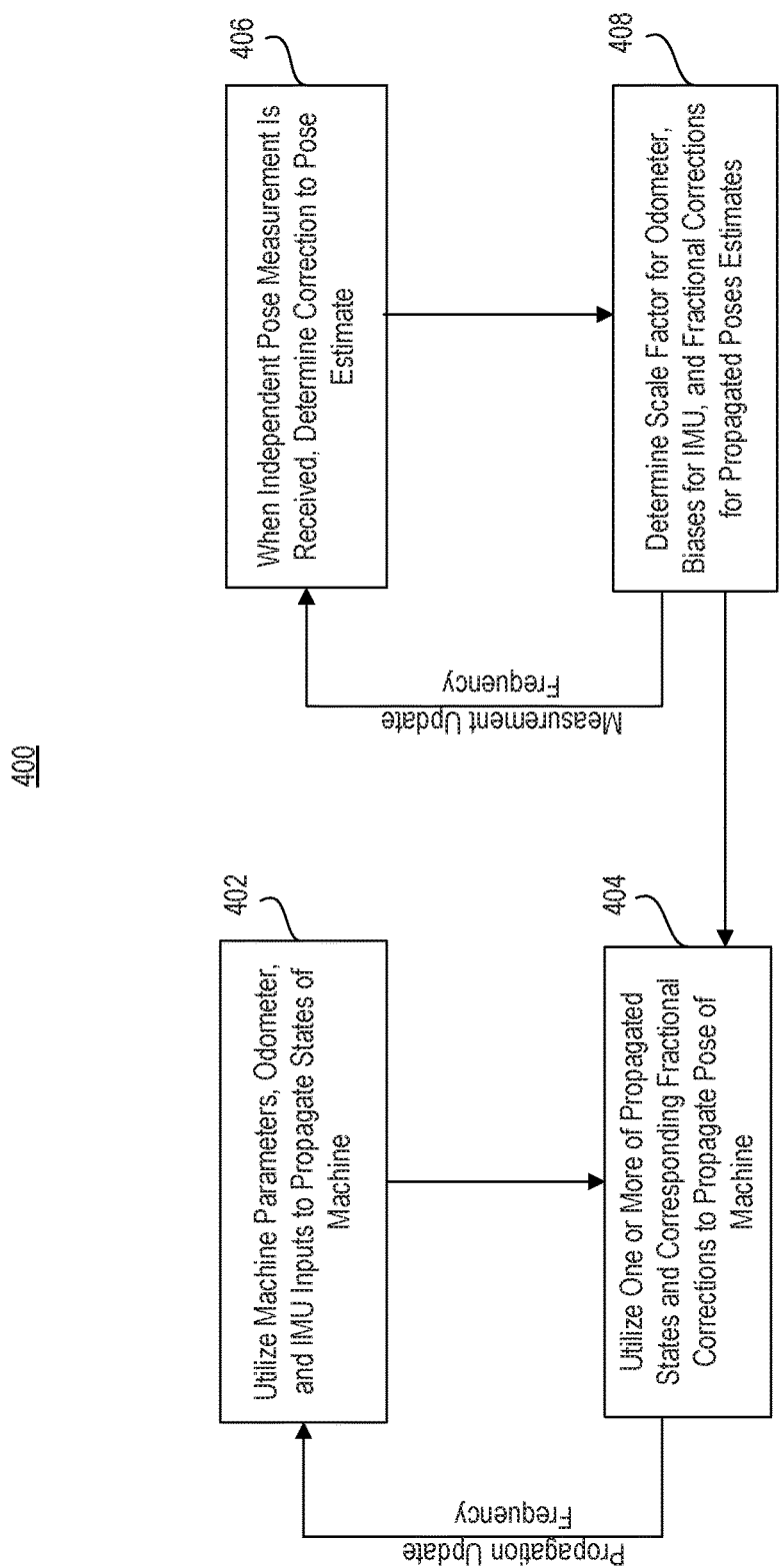
FIG. 4 is a flowchart depicting an exemplary method performed by the positioning system of FIG. 2.

The disclosed positioning system may be applicable to any machine where smooth and accurate control of the machine's pose is desired. The disclosed positioning system may provide for smoothed Kalman filter update by dividing a correction to the pose estimate into multiple fractions and applying a fractional correction to each pose estimate. Operation of positioning system 16 will now be described in connection with a method 400 as shown in the flowchart of FIG. 4.

In step 402, pose propagation unit 262 may utilize machine parameters, odometer signals, and IMU inputs to propagate the states of machine 12. For example, pose propagation unit 262 may propagate the following pose information: position, linear velocities, angular velocities, and angular orientation (attitude) of machine 12. As discussed above, pose propagation unit 262 may receive, from odometer 210, a signal indicative of the distance traveled by machine 12. Pose propagation unit 262 may calculate the distance traveled by machine 12 by multiplying the received scale factor with the number of rotations of traction device 14 included in the signal received from odometer 210. Further, pose propagation unit 262 may estimate a 3D velocity of machine 12 by dividing the x-, y-, z-components of the calculated distance by a time period corresponding to the calculated distance. In another exemplary embodiment, pose propagation unit 262 may calculate the 3D velocity of machine 12 by integrating signals indicative of a 3D acceleration from IMU 220. In another exemplary embodiment, pose propagation unit 262 may calculate the 3D velocity using signals from both odometer 210 and IMU 220 and weight the resulting velocities to generate a predicted 3D velocity. Further, the predicted 3D velocity and/or the distance traveled by machine 12 may be adjusted based on the machine parameters from performance sensor 230. For example, the distance traveled may be adjusted to account for slipping of machine 12. Pose propagation unit 262 may also receive signals indicative of the angular rates (roll rate, yaw rate, and pitch rate) of machine 12 from IMU 220. By integrating the angular rates, pose propagation unit 262 may determine the attitude or angular orientation (roll, heading, and pitch) of machine 12.

In step 404, pose propagation unit 262 may utilize one or more of the propagated states and corresponding fractional updates to propagate the pose of machine 12. For example, by utilizing the angular rates and the predicted 3D velocity, pose propagation unit 262 may estimate a position and/or an orientation of machine 12. Pose propagation unit 262 may also calculate an uncertainty for the predicted position and/or orientation, which may be set equal to the uncertainty from an error covariance matrix of the Kalman filter. Moreover, pose propagation unit 262 may update each propagated pose estimate using a fractional correction determined in step 408, to generate a corresponding updated pose. The determination of the fractional correction is described in more detail in step 408.

Pose propagation unit 262 may repeat steps 402-404 at a propagation update frequency. The propagation frequency is the frequency of odometer and/or IMU signals. That is, each time when odometer 210 and/or IMU 220 make a new measurement, pose propagation unit 262 may propagate the pose and update the propagated pose estimate with a fractional correction.

In step 406, when an independent pose measurement is received, pose measurement update unit 264 may determine a correction to the pose estimate. Pose measurement update unit 264 may utilize the propagated pose estimate output by the pose propagation unit 262 and an independent pose measurement to implement the measurement update phase of the Kalman filter. In exemplary embodiment, the propagated pose estimate used here may be the propagated pose updated with the fractional correction (step 404). Alternatively, the propagated pose estimate may be the uncorrected pose estimate. Pose measurement update unit 264 may utilize, as the independent position measurement, at least one of the location signal generated by locating device 240 and the scene data generated by perception sensor 250. In one exemplary embodiment, pose measurement update unit 264 may utilize as the independent position measurement, either the location signal or the scene data, depending on the uncertainty associated with the location signal and the scene data. In another exemplary embodiment, the location signal and the scene data may be combined based on their respective uncertainties to generate the independent position measurement. For example, the two position indications may be added by weighting them based on their respective uncertainties.

Having determined the independent pose measurement, pose measurement update unit 264 may determine a correction to the propagated pose estimate output by pose propagation unit 262 based on the propagated pose estimate output and the independent pose measurement. Exemplarily, generic Kalman filter measurement update equations may be utilized to determine the correction. Pose measurement update unit 264 may determine an error between the measured pose and the pose estimate. The error may be determined as a subtraction function, although other strategies may alternatively be implemented. Pose measurement update unit 264 may then perform a Kalman filter update based on the error to determine a correction to the pose estimate.

In step 408, pose measurement update unit 264 may determine the scale factor for odometer 210, the biases for IMU 220, and the fractional corrections for the propagated pose estimates. For example, pose measurement update unit 264 may compare the pose output from pose propagation unit 262 and the measured pose output from pose measurement update unit 264 to adjust the scale factor to bring the "predict" phase pose closer to the "update" phase pose. The adjusted scale factor may be utilized by pose propagation unit 262 in the next iteration of the "predict" phase. Similarly, pose measurement update unit 264 may also calculate the biases for IMU 220.

More importantly, pose measurement update unit 264 may determine the fractional correction based on the propagation update frequency and the measurement update frequency. For example, the measurement update frequency may be determined by the frequency of GPS signals and/or scene data. The propagation update frequency and the measurement update frequency may change based on the state of machine 12. For example, when machine 12 is in a tunnel, the GPS signal may not be available, and thus the measurement update frequency may decrease. Therefore, pose measurement update unit 264 may periodically update the propagation update frequency and the measurement update frequency. In one exemplary embodiment, pose measurement update unit 264 may divide the correction by the ratio of the propagation update frequency over the measurement update frequency, to obtain the fraction. Pose measurement update unit 264 may then apply the fraction to each propagated pose estimate.

Pose measurement update unit 264 may repeat steps 406-408 at the measurement update frequency. That is, each time when an independent pose measurement is received by machine 12, pose measurement update unit 264 may start a new process to determine a correction to the pose estimate, a fraction of the correction, a scale factor, and biases. In exemplary implementations of method 400, the propagation update frequency (for example, an IMU frequency of 100 Hz) may be higher than the measurement update frequency (for example, a GPS frequency of 1 Hz). Accordingly, steps 402-404 and steps 406-408 may be iterated independently. Each time when pose measurement update unit 264 generates a new fractional correction through steps 406-408, pose propagation unit 262 may use the new fractional correction to update each propagated pose estimate through steps 402-404.

The disclosed exemplary embodiments may allow for smooth and accurate control of the pose of machine 12. By applying a fractional correction to each propagated pose estimate, the disclosed system achieves a smoothed Kalman filter update and avoids noticeable discontinuities during the pose propagation of machine 12. This is particularly desirable when the pose updated by the Kalman filter is a parameter that practically requires continuous adjustment, such as position, velocity, and orientation of machine 12. Moreover, the disclosed system may still apply the Kalman filter update to sensor-related parameters, such as the scale factor and bias, in a single step, so as to maximize the accuracy of the pose measurement.

It will be apparent to those skilled in the art that various modifications and variations can be made to the disclosed systems and methods. Other embodiments will be apparent to those skilled in the art from consideration of the specification and practice of the present disclosure. It is intended that the specification and examples be considered as exemplary only, with a true scope being indicated by the following claims and their equivalents.

What is claimed is:

1. A positioning system for use with a mobile machine, comprising:
a first sensor configured to generate a first signal indicative of a parameter of the mobile machine;
a second sensor configured to generate a second signal indicative of a pose of the mobile machine; and
a controller in communication with the first and second sensors, the controller configured to:
generate one or more estimated poses of the mobile machine based on the first signal; and
update each estimated pose with a fraction of a correction, the correction being determined, based on the second signal, in a measurement update stage of a Kalman filter.

2. The system of claim 1, wherein the controller is further configured to:
determine whether the second signal is received from the second sensor;
when it is determined that the second signal is received, generate a measured pose of the mobile machine based on the second signal; and
perform a Kalman filter update to determine, based on the measured pose, the correction.

3. The system of claim 2, wherein the controller is further configured to perform the Kalman filter update to determine at least one of a scale factor or a bias of the first sensor.

4. The system of claim 1, wherein:
the first sensor is configured to generate the first signal at a first frequency; and
the second sensor is configured to generate the second signal at a second frequency.

5. The system of claim 4, wherein the controller is configured to determine the fraction of the correction based on the first frequency and the second frequency.

6. The system of claim 1, wherein the controller is further configured to generate the estimated pose in a propagation stage of the Kalman filter.

7. The system of claim 1, wherein the first sensor is an inertial measurement unit (IMU).

8. The system of claim 1, wherein the second sensor is a global navigation satellite system (GNSS) receiver.

9. The system of claim 1, wherein the estimated pose includes at least one of a position, an orientation, an acceleration, a velocity, a heading, or an angular rate.

10. A method of determining a position of a mobile machine, comprising:
generating, by a first sensor, a first signal indicative of a parameter of the mobile machine;
generating, by a second sensor, a second signal indicative of a pose of the mobile machine;
generating, by a controller, one or more estimated poses of the mobile machine based on the first signal; and
updating, by the controller, each estimated pose with a fraction of a correction, the correction being determined, based on the second signal, in a measurement update stage of a Kalman filter.

11. The method of claim 10, further comprising:
determining whether the second signal is generated by the second sensor;
when it is determined that the second signal is generated, generating a measured pose of the mobile machine based on the second signal; and
performing a Kalman filter update to determine, based on the measured pose, the correction.

12. The method of claim 11, further comprising:
performing the Kalman filter update to determine at least one of a scale factor or a bias of the first sensor.

13. The method of claim 10, further comprising:
generating the first signal at a first frequency; and
generating the second signal at a second frequency.

14. The method of claim 13, wherein updating the estimated pose with the fraction of the correction further comprises:
determining the fraction of the correction based on the first frequency and the second frequency.

15. The method of claim 10, further comprising:
generating the estimated pose in a propagation stage of the Kalman filter.

16. The method of claim 10, wherein the first signal is an inertial measurement unit (IMU) signal.

17. The method of claim 10, wherein the second signal is a global navigation satellite system (GNSS) signal.

18. The system of claim 10, wherein the estimated pose includes at least one of a position, an orientation, an acceleration, a velocity, a heading, or an angular rate.

19. A non-transitory computer-readable storage medium storing instructions for enabling at least one processor to execute a method of determining a position of a mobile machine, the method comprising:
receiving, from a first sensor, a first signal indicative of a parameter of the mobile machine;
receiving, from a second sensor, a second signal indicative of a pose of the mobile machine;
generating one or more estimated poses of the mobile machine based on the first signal; and
updating each estimated pose with a fraction of a correction, the correction being determined, based on the second signal, in a measurement update stage of a Kalman filter.

20. The storage medium of claim 19, wherein the method further comprises:
determining whether the second signal is received from the second sensor;
when it is determined that the second signal is received, generating a measured pose of the mobile machine based on the second signal; and
performing a Kalman filter update to determine, based on the measured pose, the correction.

* * * * *